US011477980B2

(12) United States Patent
Dennis

(10) Patent No.: US 11,477,980 B2
(45) Date of Patent: Oct. 25, 2022

(54) HUNTING BLIND SURROUNDING TREE TRUNK

(71) Applicant: Frank C. Dennis, Warsaw, OH (US)

(72) Inventor: Frank C. Dennis, Warsaw, OH (US)

(*) Notice: Subject to any disclaimer, the term of this patent is extended or adjusted under 35 U.S.C. 154(b) by 638 days.

(21) Appl. No.: 16/354,146

(22) Filed: Mar. 14, 2019

(65) Prior Publication Data

US 2019/0281814 A1   Sep. 19, 2019

Related U.S. Application Data

(60) Provisional application No. 62/643,681, filed on Mar. 15, 2018.

(51) Int. Cl.
*A01M 31/02* (2006.01)
*E04H 15/00* (2006.01)

(52) U.S. Cl.
CPC ......... *A01M 31/025* (2013.01); *E04H 15/001* (2013.01)

(58) Field of Classification Search
CPC ... A01M 31/00; A01M 31/025; E04H 15/001; E04H 15/04; E04H 15/24; E04H 15/26; E04B 1/34; E04B 1/3404; E04B 1/3412; E04B 1/3416
See application file for complete search history.

(56) References Cited

U.S. PATENT DOCUMENTS

| | | | | |
|---|---|---|---|---|
| 219,987 | A * | 9/1879 | Scott | A01G 13/0243 47/32.4 |
| 4,164,089 | A * | 8/1979 | George | A01M 31/025 43/1 |
| 4,612,948 | A * | 9/1986 | Simpson | E04H 15/001 135/117 |
| 4,884,589 | A * | 12/1989 | Simpson | E04H 15/001 135/117 |
| 4,922,942 | A * | 5/1990 | Schaeffer | E04H 15/04 135/90 |
| 8,215,056 | B2 * | 7/2012 | Frederick | A01G 13/0268 47/31.1 |
| 8,296,995 | B1 * | 10/2012 | Georges | A01G 13/0237 47/21.1 |
| 9,022,050 | B2 * | 5/2015 | Jeziorski | A01M 31/025 135/90 |
| 9,758,985 | B2 * | 9/2017 | Hayes | A01M 31/025 |
| 10,398,094 | B2 * | 9/2019 | Taylor | A01G 13/0281 |
| 10,492,486 | B1 * | 12/2019 | Hayes | A01M 31/025 |
| 10,765,184 | B2 * | 9/2020 | York | A45B 25/14 |
| 10,781,604 | B2 * | 9/2020 | York | A45B 23/00 |
| 2002/0036007 | A1 * | 3/2002 | Sellers | E04H 15/04 135/90 |
| 2006/0102216 | A1 * | 5/2006 | You | E04H 15/28 135/90 |
| 2011/0017250 | A1 * | 1/2011 | Shih | E04H 15/04 135/90 |

* cited by examiner

Primary Examiner — David R Dunn
Assistant Examiner — Danielle Jackson
(74) Attorney, Agent, or Firm — Kathryn Perales

(57) ABSTRACT

The invention relates to hunting equipment, specifically hunting blinds. It is a hunting blind which is installed surrounding a tree trunk. The hunting blind has a hole in the top, where a tree trunk can fit, and has a split or opening extending from the hole on top to the bottom edge, which can be closed after the blind is placed around the tree trunk.

2 Claims, 3 Drawing Sheets

HUNTING BLIND SURROUNDING TREE TRUNK

BACKGROUND OF THE INVENTION

Hunters sometimes lie in wait for prey inside a hunting blind, which prevents prey from seeing the hunter. A hunting blind may be a free-standing tent-like structure with windows through which the hunter can look and shoot. The hunting blind can rest on the ground, or it may perch up high in a tree.

BRIEF SUMMARY OF THE INVENTION

The invention is a ground hunting blind which zips open on one side from the ground edge all the way to the center of the roof section, and has an opening in the center of the roof intended to surround a tree trunk. The hunting blind is erected next to a tree, unzipped and moved to surround the tree trunk. The center opening is then tightened around the tree trunk, and the open side of the blind zipped closed. The hunting blind has a plurality of windows on all sides. The invention is perfect for use with a track mounted seat which attaches to and can spin around the tree trunk, allowing the hunter to easily access any window.

DETAILED DESCRIPTION OF THE INVENTION

Figure 1:
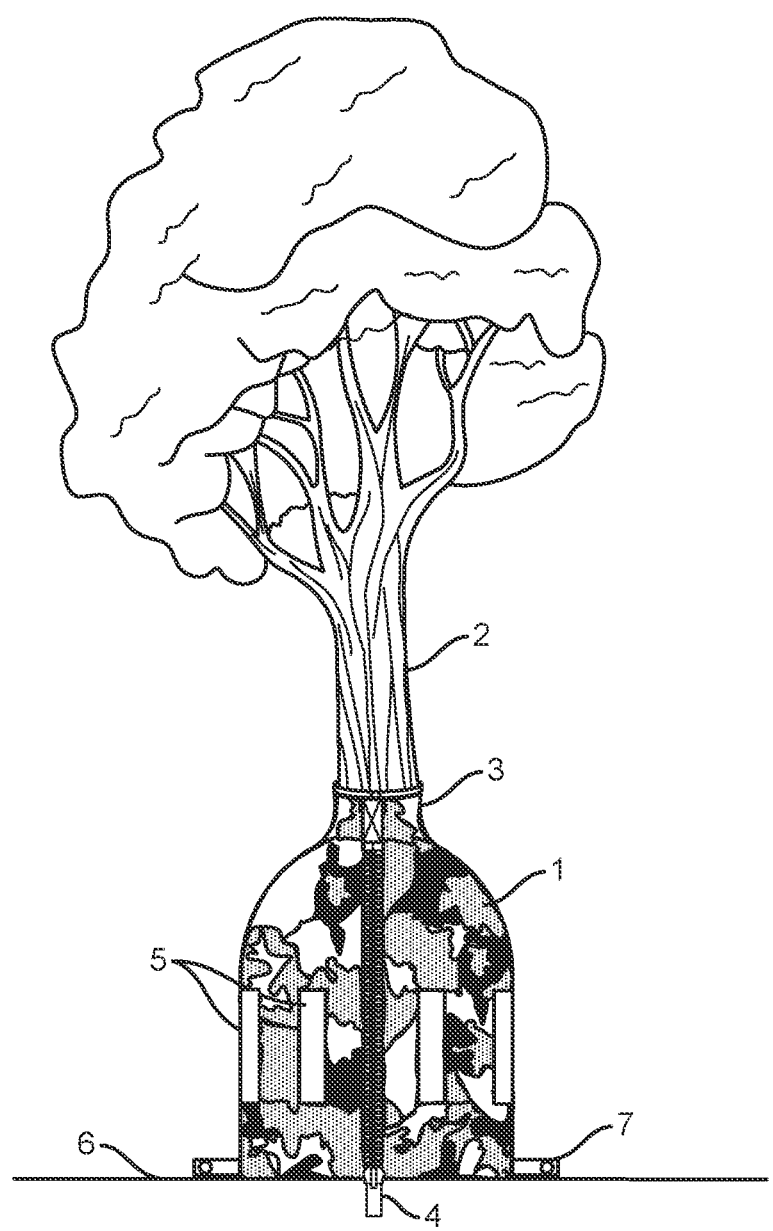
FIG. 1 is a front view of the blind installed around a tree trunk.

The invention is an improvement to a ground hunting blind. As shown in FIG. 1, the blind 1 is a free standing tent whose footprint may be any shape, such as square, hexagonal, rectangular, octagonal, or irregular. The soft version of the blind may be made of fabric, vinyl, or other flexible material, and includes a support frame. The blind has a plurality of open windows 5, which may or may not be closeable, located on the walls all around the blind, facing in different directions. The blind has a collar 3 situated at a hole 8 in the roof big enough to fit a tree trunk 2 through it. One wall of the blind is split from the ground 6 to the collar 3 and roof hole 8, and said split may be opened and closed with a zipper 4 or other method, such as hook and loop fasteners. In a preferred embodiment, a zipper closes the split from the ground to the bottom of the collar portion, and the split at the collar portion is closed by hook and loop tabs.

Figure 2:
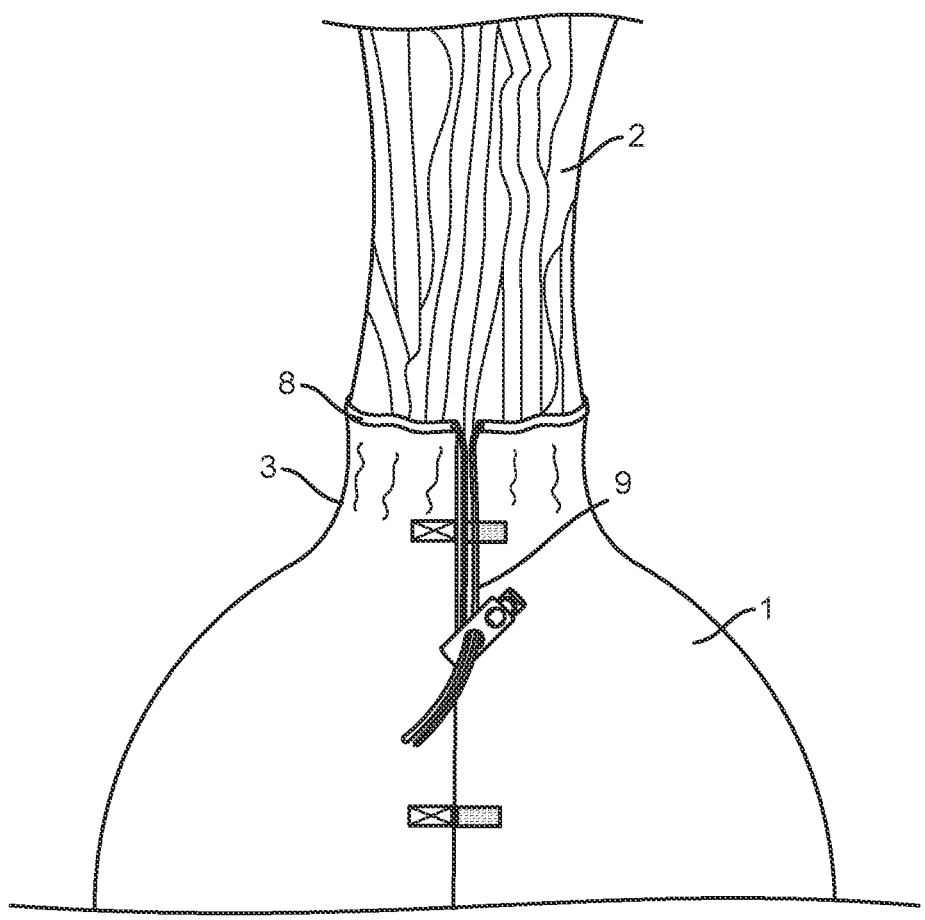
FIG. 2 is a close-up view of the collar portion of the blind.

To install the blind 1 around a tree trunk 2, one must erect the blind using the supports provided and the method specified by the blind manufacturer. Then, unzip the zipper 4 all the way and detach the hook and look tabs to open the side of the blind. Move the blind so that it fits around a tree trunk 2. Tighten the adjustable collar 3, which is located at the roof hole 8, to securely fit around the tree trunk 2. In a preferred embodiment shown in FIG. 2, the collar 3 is secured around the tree trunk with a drawstring 9. Zip the split side of the blind closed. Place stakes in the grommets 7 located at various points around the bottom edge of the blind.

Figure 3:
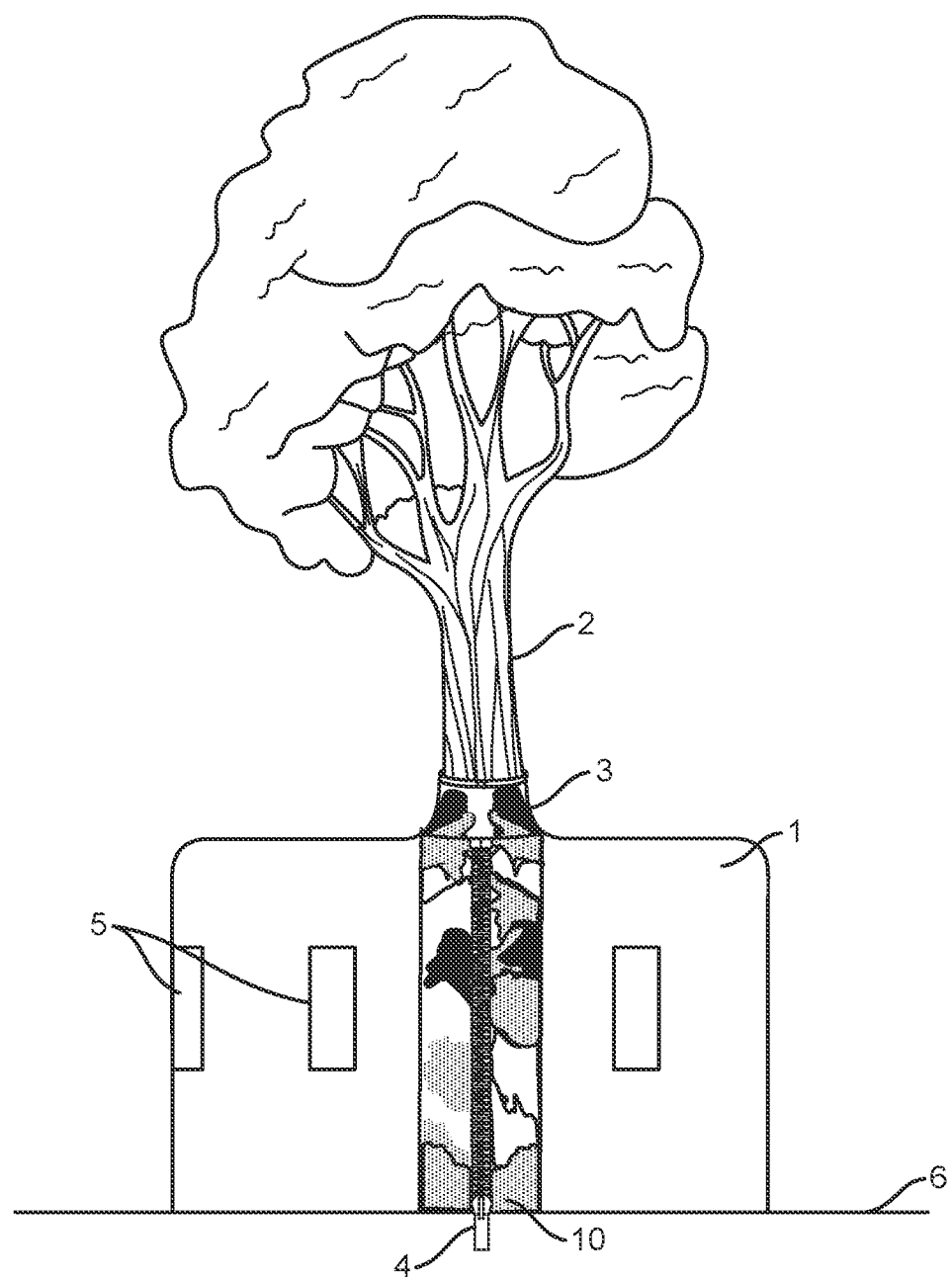
FIG. 3 is a front view of a hard version of the blind installed around a tree trunk.

As shown in FIG. 3, the blind may alternatively be made of a hard substance such as plastic, so that it is not collapsible. In a preferred embodiment with one split, the split in the blind must be wide enough for a tree trunk 2 to fit through it. After the blind 1 has been placed around a tree trunk 2, the fabric collar 3 may be secured around the tree trunk with a drawstring or other method as with the soft blind. A curtain 10 covers the wide split in the hard blind, and may be closed with a zipper 4 and/or hook and loop tabs, or other closure methods.

Both the soft and hard versions of the blind may have more than one split extending from the collar 3 to the bottom edge. This would allow the hard blind to be transported in two or more pieces, and the splits would not need to be so wide as the tree trunk. Each of the multiple splits can be closed using the same methods as when the blind has only one split—for example, zipper and/or hook and loop tabs up to the top of the collar 3, then drawstrings 9.

The invention is ideal for use with a seat which mounts on a track which is attached to the tree trunk inside the blind. A hunter seated on the seat can move all the way around the tree trunk so as to see out of all of the blind's windows. Of course, any type of seat may be used that will fit inside the blind.

The invention claimed is:

1. A hunting blind, having a roof, walls, and a bottom edge:
    wherein one or more of said roof, walls and bottom edge are made of a hard material; and
    said blind having a hole in the middle of the said roof large enough to accommodate a tree trunk; and
    said hole in the roof having a collar made of fabric or other flexible material, which has a means for tightening around the tree trunk; and
    said blind having one or more splits, each of which extends from the hole in the roof down to the bottom edge of the blind, and which allows the blind to open and to be installed around the tree trunk; and
    each of said one or more splits having one or more means to close the split; and wherein one of said one or more splits is wide enough to fit around the tree trunk, and wherein said wide split has two curtains, one curtain attached to each side of said wide split, said two curtains being made of fabric or other flexible material, and said two curtains having a means to close the split.

2. The hunting blind of claim 1, wherein said one or more splits comprises a plurality of splits, and thus being the hunting blind is made of a plurality of pieces which attach to each other; and
    wherein each of said splits has two curtains made of fabric or other flexible material, with one curtain being attached to each side of said split, and which curtains have a means to close the split.

* * * * *